Dec. 18, 1962    J. S. KILBY ETAL    3,069,261
METHOD OF MAKING POROUS METAL BODIES
Filed Oct. 25, 1957
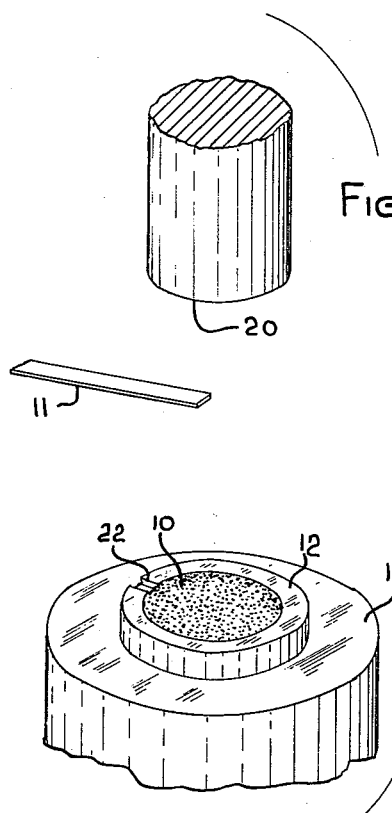
FIG. 1
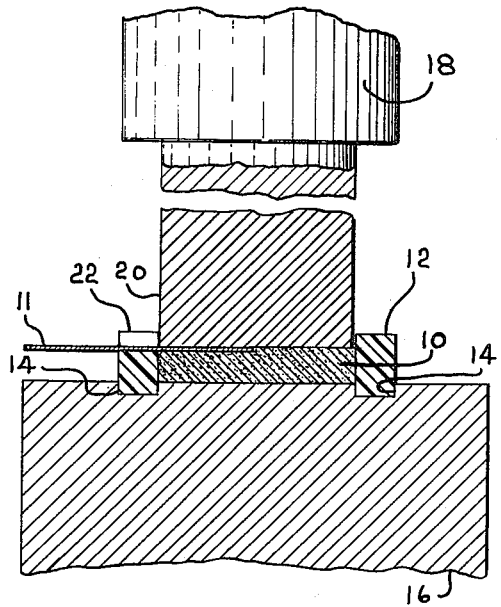
FIG. 2
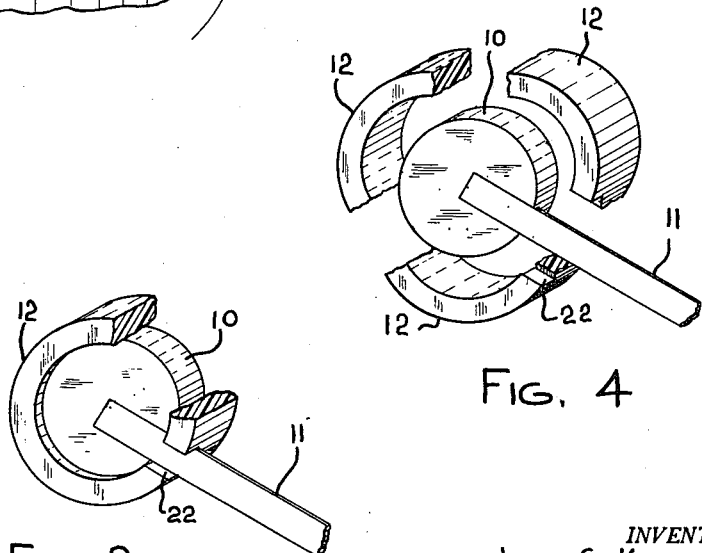
FIG. 3
FIG. 4
INVENTORS
JACK S. KILBY
BY EVERETT J. WILLIAMSEN
John W. Michael
ATTORNEY 3,069,261
METHOD OF MAKING POROUS METAL BODIES
Jack S. Kilby and Everett J. Williamsen, Milwaukee, Wis., assignors to Globe-Union Inc., Milwaukee, Wis., a corporation of Delaware
Filed Oct. 25, 1957, Ser. No. 692,488
1 Claim. (Cl. 75—226)

This invention relates to porous bodies of compressed adherent particles of an anodizable metal and to the method of making such bodies.

Such porous bodies made of tantalum, aluminum, tungsten, columbium, hafnium, zirconium, titanium, and other anodizable metals when anodized have a dielectric or barrier film which makes such bodies useful, for example, in electrolytic capacitors; particularly those recently developed using a solid electrolyte.

The customary procedure in the production of such so-called porous bodies (body made of metal powders) is to mix the metal powder (particles) with a binder, pellet it to shape, and sinter the pellets. Such sintering takes place at a temperature of over 3000° F. in a vacuum. The high temperature vacuum furnace required for this step is very expensive, thereby making it desirable to produce a body of this type by an alternate method.

It is the object of this invention, therefore, to manufacture a porous body of anodizable metal by an improved, inexpensive, and efficient method.

Another object is to provide a porous body of compressed particles of an anodizable metal which have been adhered by passing electric current through such parts while under pressure.

A further object is to provide a die pad for use in the manufacture of such porous bodies which is effective during use and may be readily removed from the body after completion.

These objects are attained by using electrodes of tungsten or like metal which can be pressed toward each other, placing a confining ring of alumina or other suitable ceramic on one electrode, filling such ring with the particles of the anodizable metal, compressing such particles while confined in said ring, and passing current through such particles of sufficient amount to sinter or weld the particles into a body of desired porosity. A standard welder may be used to supply the desired current.

The features of this invention are pointed out in the appended claim. The invention itself may best be understood from the following description read in connection with the accompanying drawing, in which:

FIG. 1 is a view in perspective showing apparatus used in the method embodying the invention, with the particles of anodizable metal filling the retaining ring before compression;

FIG. 2 is a sectional view of such apparatus after the particles have been compressed and the sintering current applied to weld the body;

FIG. 3 is a view in perspective, with part broken away, showing the retaining ring and finished porous body; and FIG. 4 is a perspective view similar to FIG. 3 illustrating how the retaining ring may be shattered to remove the finished porous body.

The porous body 10 shown in the drawing is approximately 0.156 inch in diameter and substantially 0.030 inch in thickness. Hence, the drawing is greatly enlarged. The body 10, after it has been anodized to form a dielectric film thereon, can be used in electrolytic capacitors. In such instances a wire of conductive metal 11 is bonded to the body before anodizing to form one lead of the capacitor. The other electrode of the capacitor consists of either a wet or dry electrolyte or, as more recently found practical, a solid electrolyte such as a layer of semiconductive oxide and an electrically conductive covering layer.

The particles of anodizable metal are placed within a ceramic ring 12 to the level desired. This lever may be determined by any convenient method, such as filling to the top of the ring or by supplying a premeasured amount of particles. The bottom of the ceramic ring 12 is located within a circular groove 14 within the lower tungsten electrode 16, thereby definitely locating the particles of anodizable metal in relation to an upper tungsten electrode 18. This electrode has a male member 20 which will fit loosely within the ring 12. After the ring 12 is charged the electrodes are moved toward each other and the particles of anodizable metal are compressed between the lower tungsten electrode 16 and the male member 20 being retained by the ceramic ring 12. The amount of this compression and resultant density (porosity) is controlled by standard mechanism (not shown) determining the amount of movement of the electrodes toward each other. One example of a practical density results from compressing the particles about one-fourth of the uncompacted volume. The purpose of obtaining a degree of porosity is to provide a larger surface area on which the barrier film can subsequently be formed.

A voltage is applied between the tungsten electrodes 16 and 18 and a current passes through the compacted particles of anodizable metal. This current raises the temperature, thereby sintering or welding the particles of anodizable metal into a porous body suitably for the uses heretofore described. A suitable current is 200,000 amperes per square inch for a period of one-tenth second. This current sinters the particles so quickly that a vacuum is not required.

An important feature of this invention resides in the ceramic ring 12. Many materials gall and become undercut on continued use, thereby making it difficult to remove the final product and also to produce subsequent products of different dimensions. Therefore, it has been determined that a disposable ring of a ceramic material such as alumina or steatite is most suitable. The ring 12 has a relatively thin wall which is strong enough to retain the particles during compression but which will shatter during the final stage of sintering. However, it may be desirable to confine the sintered body in the ring during subsequent operations. In such case the ring may be stronger, i.e. its wall thickness increased. In any event, the finished body can be removed from the ring by merely fracturing it as shown in FIG. 4. The wall of the ring shown is approximately 0.03125 inch.

As previously explained, a lead wire 11 is, in some instances, bonded to the body 10. This may be done in the compressing and sintering steps if the wire is made of the same metal as the particles. In such case the ring 12 has a notch 22 in the upper end which accommodates the wire 11. The wire is pressed into the particles and is welded in place during the sintering. However, the lead may be attached by other means such as spot welding if done prior to the anodizing of the body. The characteristics of the body so made are comparable to those of a porous slug manufactured by the expensive high temperature vacuum furnace method.

While the embodiment described hereabove produces a part suitable for use in electrolytic capacitors, this disclosure and the claim listed below should not be limited to this extent. Other uses for porous sintered articles of this type are numerous and will be recognized by a person skilled in the art.

We claim:

A method of manufacturing a sintered porous metal body which comprises, providing a fired hard easily shatterable hollow ceramic member with a confining wall strong enough to restrain fracture during compression of metal particles within said member and thin enough to shatter during the final stage of adhering of metal particles into a body, placing particles of an anodizable metal within the space defined by the inside of said hollow ceramic member, applying opposing metal terminals to said particles, compressing said particles between said metal terminals while retained by said member, passing an electrical current between said metal terminals until said particles are adhered into a body and said ceramic member is fractured by the heat and growth inherent in the adhering action, and withdrawing said terminals.

References Cited in the file of this patent

UNITED STATES PATENTS

| | | |
|---|---|---|
| 1,599,924 | Sanborn | Sept. 14, 1926 |
| 2,021,576 | McKenna | Nov. 19, 1935 |
| 2,077,345 | Van der Pyl | Apr. 13, 1937 |
| 2,149,596 | Gillett et al. | Mar. 7, 1939 |
| 2,180,988 | Lemmers et al. | Nov. 21, 1939 |
| 2,355,954 | Cremer | Aug. 15, 1944 |